July 30, 1940.  C. C. STRANGE ET AL  2,209,426
SPEED CONTROL APPARATUS
Filed Nov. 30, 1937  2 Sheets-Sheet 1
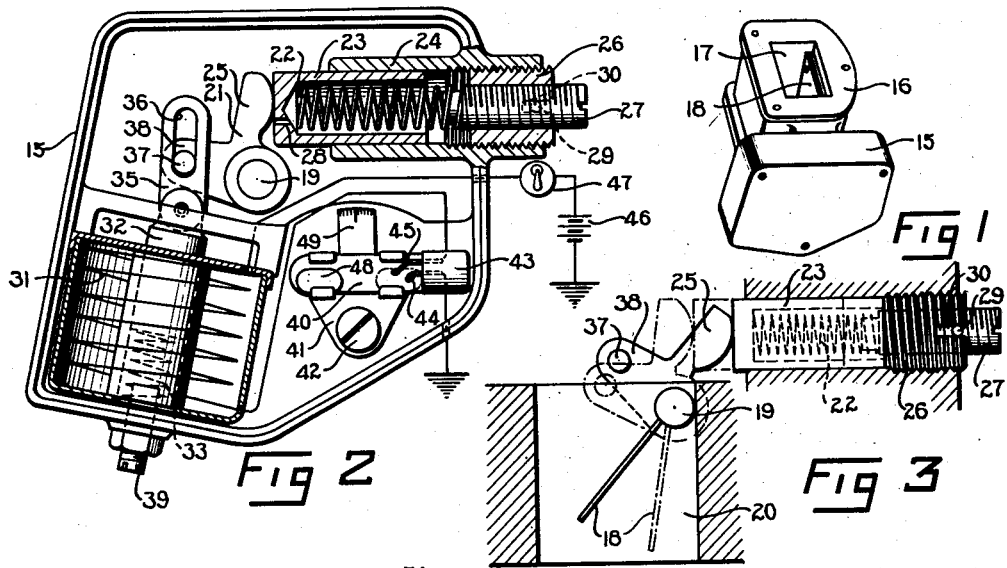
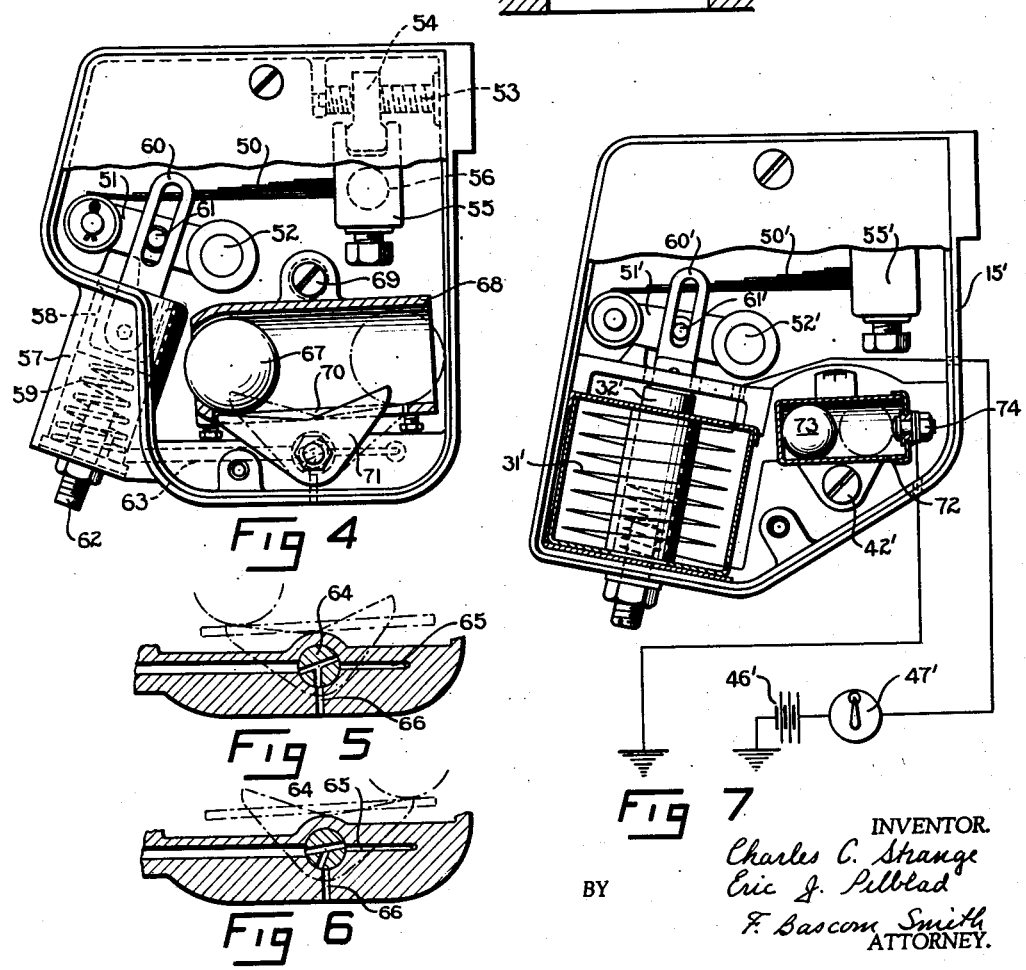
INVENTOR.
Charles C. Strange
Eric J. Pilblad
F. Bascom Smith
ATTORNEY.

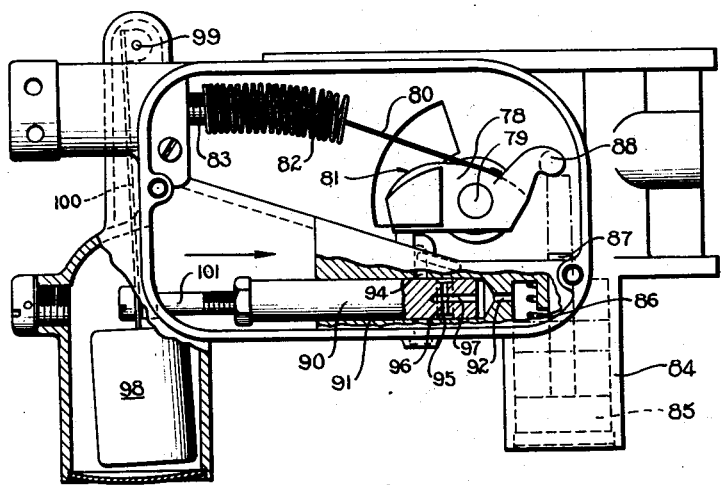
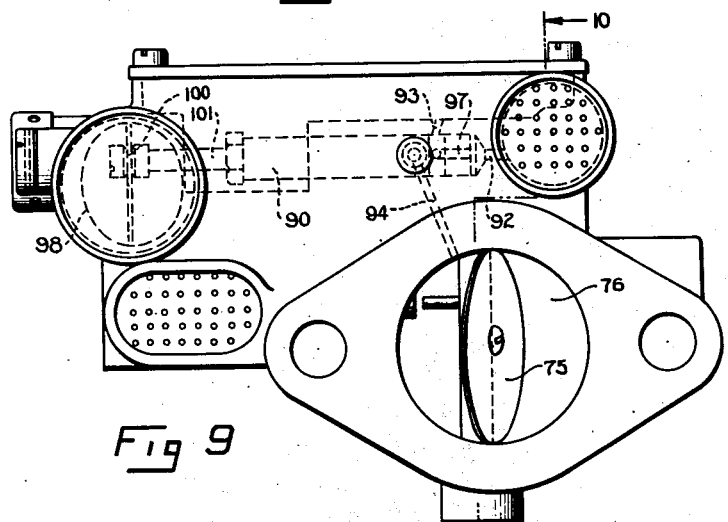
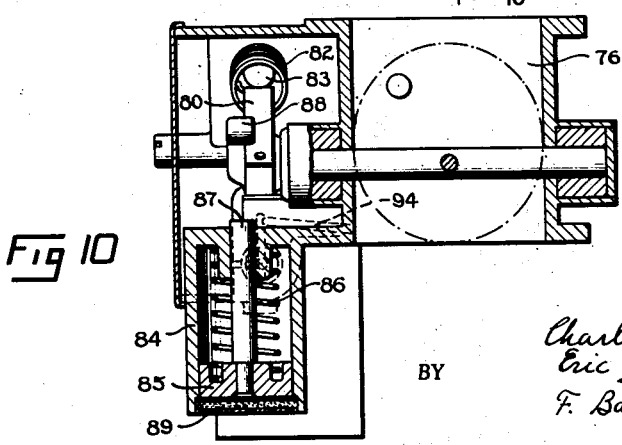

Patented July 30, 1940

2,209,426

UNITED STATES PATENT OFFICE 2,209,426

SPEED CONTROL APPARATUS

Charles C. Strange, Port Richmond, Staten Island, and Eric J. Pelblad, Rockville Centre, N. Y.

Application November 30, 1937, Serial No. 177,227

2 Claims. (Cl. 137—152)

This invention relates to internal combustion engines and more particularly to means for governing and controlling the speed of operation thereof under various operating conditions.

It has been heretofore suggested to provide governing means for limiting the speed or revolutions per minute of the internal combustion engines employed in motor vehicles, for example, by controlling the size of the fuel intake passage and thereby preventing operation of the engine above a predetermined maximum speed and controlling the maximum car speed when the car is being moved solely by the motive power of the engine. Governors of the above character which have been heretofore provided have not proved entirely satisfactory in use for controlling car speed for the reasons, among others, that the same undesirably limit the available power independently of the speed of the vehicle when the engine is operating in a low ratio gear, as distinguished from high gear or direct drive, such as when starting the vehicle in motion and when climbing hills. Additionally, in the governors heretofore suggested, it has also been necessary to employ special, as distinguished from conventional spring means or special cam means and linkages, thereby substantially increasing the cost and complicating the construction of the governor. Also, the mode of operation of prior governors of the above type results in decreased operating efficiency throughout a wide range of speeds below the desired maximum speed.

Accordingly, one of the objects of the present invention is to provide novel speed governing means for internal combustion engines whereby the above disadvantages and objections are obviated.

Another object of the invention is to provide novel air-velocity governor means for controlling the speed of internal combustion engines which means are so constructed that the same will not affect the operating characteristics of the engine until the maximum desired speed is attained.

Still another object is to provide novel control means for a governor for motor vehicles whereby the same may be rendered inoperative or ineffective when the vehicle is being accelerated at a predetermined rate or ascending an incline having a predetermined slope.

A further object is to provide novel speed governing means of the air-velocity type wherein the air actuated valve will not flutter or oscillate during operation of the engine on which the same is installed.

A still further object is to provide a novel governor which is controlled by fluid pressure in the intake passage of an internal combustion engine and wherein a positive adjustable stop is provided for limiting the opening movement of the air actuated control valve.

Another object is to provide a governor in combination with an internal combustion engine which is so constructed that the maximum engine speed may be automatically varied in accordance with existing operating conditions.

Another object is to provide a simply constructed, efficient governor for internal combustion engines which may be readily and inexpensively manufactured and installed and which may be readily adjusted.

The above and further objects and novel features of the invention will more fully appear from the following detailed description when the same is read in connection with the accompanying drawings. It is to be expressly understood, however, that the drawings are for the purpose of illustration only, and are not intended as a definition of the limits of the invention, reference for this latter purpose being had primarily to the appended claims.

In the drawings, wherein like reference characters refer to like parts throughout the several views, Fig. 1 is a perspective outside view on a small scale of one form of the novel governor and control means therefor comprehended by the present invention;

Fig. 2 is a side elevation, partly in section and with the cover removed, of the form of governor and control means therefor illustrated in Fig. 1;

Fig. 3 is a diagrammatic detail view of said governor illustrating the control valve and the actuating means therefor;

Fig. 4 is a view similar to Fig. 1 illustrating a second embodiment of the invention, wherein vacuum control means are employed;

Figs. 5 and 6 are diagrammatic detail views showing the vacuum control valve of said second embodiment in different positions;

Fig. 7 is a view similar to Fig. 2 of a third embodiment employing another form of combination gravity and inertia control means;

Fig. 8 is an end elevation, partly in section and with parts broken away, of another embodiment of the invention;

Fig. 9 is a bottom view of the embodiment of Fig. 8; and,

Fig. 10 is a sectional view, with parts broken away, taken substantially on line 10—10 of Fig. 9.

A limited number of embodiments of the invention are illustrated, by way of example, in the accompanying drawings in the form of air-velocity governors and novel control means therefor adapted for use on internal combustion engines and particularly on those employed for propelling vehicles. The novel governor illustrated may be readily installed between the engine carburetor and the intake manifold of the engine whereby the quantity of fuel entering the engine cylinders may be restricted by a suitable valve in the intake passage, which valve is urged toward closed or flow restricting position by flow of air through said passage and toward open position by yielding means to be hereinafter fully described. Novel control means are provided in combination with said governor whereby the latter may be rendered ineffective when the vehicle is in first or second gear, when accelerating quickly from low to high gear, or when climbing an incline, thereby insuring maximum power and capacity speed when it is most desired or necessary. Said control means may be so constructed as to limit the maximum revolutions per unit of time of the engine independently of the existence of the last-mentioned operating conditions.

In the embodiment illustrated in Figs. 1 to 3, inclusive, the novel governor comprises a casting having a hollow housing portion 15 and a conduit portion 16 adapted to be secured between the vehicle engine carburetor and the intake manifold thereof (not shown). Conduit portion 16 is preferably provided with a rectangular opening 17 which registers with and constitutes a connecting passage between the carburetor and intake manifold and has an unbalanced valve 18 pivotally mounted therein. Said valve is shown as being secured at the upper edge thereof to a shaft 19 which is rotatably mounted in casting 15, 16 adjacent one side of opening 17 and extends into housing 15. Shaft 19 preferably has close sliding engagement with the wall of opening 17 to thereby minimize the flow of air or fuel therebetween, for a purpose to more fully appear hereinafter. Thus, as air flows through passage 17 in the direction indicated by the arrows in Fig. 3, i. e., into the engine cylinders, a pressure is built up in the pocket 20 beneath valve 18 and tends to move the valve toward closed position to restrict said passage. The magnitude of said pressure depends upon the velocity of the air or fuel which passes thereby which is, in turn, dependent upon the suction created in the engine cylinder.

Novel means are provided within housing 15 for resisting and controlling the movement of valve 18 whereby the same will snap to closed position when the engine reaches a predetermined maximum speed, thereby limiting the speed of the vehicle, and snap back to open position when the speed drops slightly below said predetermined speed. Said means accordingly insure the availability of maximum power output during engine operation up to the desired maximum speed and do not hinder the performance and efficiency of operation of the engine. In the form illustrated, said means comprise a bell crank lever 21 mounted on and rigidly secured to the end of shaft 19 which extends into housing 15 and a coil spring 22 for yieldingly resisting clockwise rotation of said lever and shaft and, hence, the closing movement of valve 18. Spring 22 is housed within a hollow piston 23 that is slidably mounted in a cylinder 24 which may be integral with housing 15, said spring being under compression and adapted to hold piston 23 in engagement with arm 25 of crank 21.

In order to provide means for rendering the governor of Fig. 2 adjustable so that the engine speed at which the same becomes operative may be varied, and for insuring against engine operation at any speed in excess of a predetermined maximum, the outer end of cylinder 24 is internally threaded for receiving a sleeve 26 that is threaded both externally and internally. A screw 27 extends through sleeve 26 in engagement with the internal threads thereof and positions the outer end of spring 22. The diameter of screw 27 is somewhat less than the inside diameter of the hollow portion of piston 23 thereby permitting the latter to engage sleeve 26 which constitutes a positive stop for limiting the movement of said piston in valve closing direction and, hence, for positively limiting the maximum engine speed. By adjustment of screw 27, the initial compression of spring 22 and, hence, the pressure at which the same will start to yield may be readily adjusted. Since the pressure tending to collapse spring 22, that is, the effective pressure in pocket 20 tending to move valve 18 in a clockwise direction, as viewed in the drawings, varies with the engine speed, it will be seen that the speed at which said valve closes may be varied by adjusting screw 27.

As indicated in Fig. 2, when valve 18 is in open or dotted-line position, pocket 20 is comparatively small and the air flowing into the same in the direction of the arrows exerts a comparatively small pressure on the face of the valve and, hence, establishes only a small turning moment acting through arm 25 and against spring 22. When this pressure becomes great enough, due to increased suction in the engine cylinders at high speed operation, to overcome the initial resisting pressure of spring 22, it will be seen that the effective pressure of the air or fuel charge on the lower face of valve 18 increases at a rapid rate as said valve turns toward closed position. In order, therefore, to obtain a snap action of valve 18 at the desired maximum speed and, hence, high efficiency of operation up to such speed, spring 22 and the motion transmitting means interposed between said spring and valve are so chosen that the increasing pressure exerted by the spring due to compression thereof will increase at the same rate as or more slowly than the effective fluid pressure acting on valve 18. The size and resiliency of spring 22 may be readily determined by experiment. A conventional or standard spring, the pressure of which is proportional to the amount of compression, may be employed, since, as already pointed out, the fluid pressure on valve 18 increases rapidly once the valve begins to move toward closed position.

A vent 28 is preferably provided in either cylinder 24 or piston 23 to avoid the creation of a vacuum or fluid pressure in the former which would hinder the movement of the latter. If desired, openings 29 may be provided in sleeve 26 and screw 27 for registration with each other and diametrically disposed slots 30 in the walls of cylinder 24 to receive a locking wire or pin whereby the parts may be locked in adjusted position.

Governors of the above types heretofore provided which control the vehicle speed by limiting the speed of the engine are necessarily inefficient and unnecessarily limit the speed and power available in low or second gear. This is particularly noticeable when the vehicle is climbing a hill or is starting from a standstill. Accordingly, the present invention provides novel control means for a governor whereby the latter is rendered ineffective to limit the engine speed in accordance with the setting of sleeve 26 when the vehicle is accelerated, such as in low or second gear, and when the same is ascending a hill. Said means, in the form illustrated in Fig. 2, comprise a solenoid mounted in housing 15 and includes a coil 31 and a reciprocable core 32, the latter being normally, yieldably held in the illustrated position by a coil spring 33. Pivotally secured to the upper end of core of plunger 32 is an arm 35 which is provided with an elongated slot 36 into which a pin 37 slidably extends, said pin being secured to or formed integrally with arm 38 of bell crank 21, whereby valve 18 may be moved from its limiting closed position to or toward open position when plunger 32, 35 is pulled downwardly, as viewed in the drawings, by energization of coil 31 and thus render the governor ineffective.

Preferably, however, governor is not rendered entirely ineffective in the above-described manner but rather remains effective to prevent operation of the engine at a speed in excess of the maximum speed which the engine manufacturer's guarantee usually designates, which maximum speed may be greater than that required on a level road to give the desired maximum vehicle speed in high gear. To accomplish this purpose and mode of operation, an adjustable stop screw 39 is provided for limiting the downward movement of plunger 32. Accordingly, the engagement of pin 37 with the upper end of slot 36 limits the extent to which valve 18 may be closed by fluid pressure in intake passage 17 when solenoid coil 31 is energized, thereby allowing fluid pressure to close valve 18 a sufficient amount to prevent the engine from running at a speed in excess of the manufacturer's guarantee speed when said solenoid is energized.

In order to effect energization of coil 31 for rendering the governor ineffective or partially ineffective, as above described, when the vehicle is ascending a hill or operating in low or second gear, said coil may be connected in circuit with a source of electrical energy and suitable switch means which may be inertia or gravity actuated or adapted to be actuated positively by the operator either directly or through the gear shifting mechanism of the vehicle. One preferred form of switch means for the above purpose constitutes a combination inertia and gravity actuated switch comprising, in the form shown, an elongated bulb or tube 40 secured to and supported by a bracket 41. The latter is mounted for free angular movement on and is adapted to be locked in any desired angular position relative to housing 15 by a screw 42 which is provided with an enlarged head and threadedly engages the rear wall of said housing.

Tube 40 carries a base portion 43 of insulating material through which a pair of contacts 44 and 45 extend into said tube. The outer end of contact 44 is connected to ground in any suitable well-known manner, whereas contact 45 is connected to ground through coil 31 and a source of electrical energy, such as battery 46. Preferably, the engine ignition switch or other manually actuated switch 47 may be included in the above circuit to obviate any drain on battery 46 when the vehicle is parked on an incline.

Freely supported in bulb 40 is a small quantity of mercury 48 or similar substance which is effective, when in the dotted-line position (Fig. 2), to complete the above-described circuit and energize solenoid 31, 32. Bracket 41 is so adjusted, as may be indicated by a scale 49, that bulb 40 slopes downwardly in the direction of movement of the vehicle, i. e., in the direction of the arrow, when the vehicle is on a level road, thereby causing mercury 48 to normally assume the full-line position illustrated at the opposite end of bulb 40 from contacts 44, 45. When, however, the vehicle is accelerated at a sufficiently high rate, such as when starting in low or when picking up speed in second gear or even in high gear, the inertia of mercury 48 causes the same to move into engagement with contacts 44, 45 to thereby close the circuit to solenoid 31 and render the governor ineffective in the manner heretofore fully described. Mercury 48 will also move towards the rear or to the right, as seen in the drawings, in response to the force of gravity when the vehicle is ascending a hill having a slope which is greater than and opposite in direction to that at which bulb 40 is set.

Any well-known type of switch actuated by the vehicle gear shifting mechanism may be substituted for the mercury switch, if desired, for the purpose of rendering the governor ineffective whenever the engine is operating in a particular gear, such as in low or second gear. Switches of this character are old and well known in the art and it is accordingly believed to be unnecessary to specifically illustrate and describe any particular form thereof, the switch, per se, constituting no part of the present invention.

A second embodiment of the invention is illustrated in Figs. 4 to 6, inclusive, in combination with a well-known type of governor wherein the closing movement of the valve in the intake passage is yieldingly resisted by a specially constructed leaf spring 50. The latter acts against an arm 51 which is rotatable with a shaft 52 on which said valve is mounted and the initial tension of said spring may be adjusted by means of a screw 53 cooperating with a part 54 to pivot a member 55 which supports the spring around pivot 56.

Novel fluid pressure control means are provided in lieu of the electrical control means of the first embodiment to render the governor of Fig. 4 ineffective for the purposes and at the times above described. As shown, said means comprise a cylinder 57 in which a piston 58 is slidably mounted, a spring 59 being provided for normally holding said piston in the illustrated position. An arm or piston rod 60 corresponding to arm 35 is pivotally secured to said piston and is slotted in the same manner as said arm for receiving a pin 61 projecting from lever 51. The movement of piston 58, which may be effected by vacuum in a manner to appear hereinafter, is adjustably limited by a stop screw 62.

To effect movement of piston 58 against the pressure of spring 59, cylinder 57 may be connected to a suitable source of vacuum, such as the intake manifold (not shown), through a passage 63, a rotary valve 64, when the latter is in the position illustrated in Fig. 6, and a passage 65 formed in the governor casing. Normally, cylinder 57 is connected to atmosphere through passage 63, valve 64 (Fig. 5), and a passage or port 66.

For actuating valve 64 to effect the above connections, a gravity and inertia actuated ball 67 is freely mounted in a tube 68 which is angularly adjustable on and adapted to be held in position by a screw 69. The lower side of tube 68 is provided with an axially extending slot 70 for receiving a flat crank member 71 that is secured to valve rotor 64 for angular movement therewith. The upper edge of member 71 is somewhat V-shaped so that, as ball 67 is shifted from one end of tube 68 to the other in the same manner as described above in connection with mercury 48, the valve will be shifted thereby from one of the positions illustrated in Figs. 5 and 6 to the other. Tube 68 is normally tilted downwardly and forwardly just as is bulb 40 of Fig. 2.

In a third embodiment of the invention (Fig. 7), electrical control means are illustrated in combination with the type of governor illustrated in Fig. 4. In this embodiment, the solenoid 31, 32 of Fig. 2 is substituted for the fluid pressure motor of Fig. 4 and like parts are designated by the same numerals employed in Figs. 2 and 4, said numerals being primed, however, in Fig. 7. The novel switch means for effecting energization of coil 31' are constituted by a tubular metallic casing 72 which is adjustably mounted on housing 15' by means of a screw 42' and electrically insulated therefrom. A freely rolling metallic ball 73 is provided in casing 72 in electrical contact therewith, said ball normally assuming the illustrated full-line position at one end of the casing by reason of the adjusted slope of the latter. Mounted on and insulated from the other end of said casing is an electrical contact terminal 74 which is electrically connected to ground and adapted to be engaged by ball 73 when the latter moves to the right in response to inertia or gravitational forces. Casing 72 is itself connected to ground through coil 31', switch 47' and battery 46'. Thus, whenever ball 73 engages terminal 74, solenoid 31', 32' will be energized for rendering the governor ineffective or partially ineffective, as heretofore pointed out.

Still another embodiment of the invention including a pendulum controlled fluid pressure motor is shown in Figs. 8 to 10, inclusive, wherein another well-known type of governor is shown. Said governor comprises an unbalanced valve 75 mounted in the intake passage 76 on a rotatable shaft 79. A cam member 78 is secured to one end of said shaft and has one end of a flat flexible spring or plate 80 attached thereto so as to engage the cam contour 81 of member 78 as shaft 79 rotates in a clockwise direction, as viewed in Fig. 8, in response to the tendency of valve 75 to be moved to closed position by the fluid which passes through passage 76. The opposite end of strap 80 is connected to a coil spring 82, the effective length of which may be varied by rotation of a screw 83 that extends into the end thereof and meshes therewith. Since the above-described governor is old and well-known in the art, it is believed that a further detailed description thereof is unnecessary, said governors, per se, constituting no part of the present invention.

For the purpose of rendering the governor of Fig. 8 ineffective to limit the engine or vehicle speed under the operating conditions heretofore mentioned, a fluid pressure motor comprising a cylinder 84 and piston 85 is provided. Said piston is normally held in lowered position by gravity and a spring 86 and has a piston rod 87 secured to the upper end thereof which is adapted to engage an extension 88 on cam member 78. Thus, when piston 85 is in raised position, rod 87 engages arm 88, thereby preventing clockwise movement of member 78 and, hence, the closing movement of valve 75. Cylinder 84 below piston 85 is open to atmosphere through a perforated screen 89 (Fig. 10) and the upper end thereof may be alternately connected to atmosphere or to the intake manifold of the engine (not shown) by means of a reciprocating valve 90.

As shown, valve 90 slides in a cylindrical bore 91, the inner end of which is connected with the upper end of cylinder 84 through a passage 92. Said bore is also connected with atmosphere by means of a port 93 (Fig. 9) and with the intake manifold through a cored passage 94. Valve 90 is provided with a peripheral groove 95 and a plurality of radial passages 96 adapted to register with ports 93 and 94 and communicate constantly with the inner end of bore 91 through an axial passage 97 in said valve. Thus, when valve 90 is in the illustrated position with groove 95 in registry with atmospheric port 93, atmospheric pressure will exist in both ends of cylinder 84 and piston 85 will accordingly remain in its lowered position where it is held by gravity and spring 86. When valve 90 is moved to the left, as viewed in the drawings, to bring groove 95 into registry with passage 94, the end of cylinder 84 will be connected to the intake manifold or other source of sub-atmospheric pressure and evacuated. Piston 85, together with rod 87, will then be lifted by the pressure acting on the lower face of said piston and rod 87 will engage arm 88 of member 78 to move and hold valve 76 in open position. If desired, suitable stop means corresponding to screw 39 of Fig. 1 may be employed for limiting the upward movement of piston 85 by suction from the source of vacuum.

For the purpose of operating valve 90 in the desired manner, a weight 98 is pivotally suspended from pivot 99 by means of a strap 100 and is connected to the valve by a rod 101 so that swinging movement of the weight reciprocates the valve. Thus, when the vehicle moves in the direction of the arrow and weight 98 is sufficiently affected by inertia or gravity, it will cause movement of valve 90 to the left or rear and connect cylinder 84 with the intake manifold to thereby render the governor ineffective in the manner heretofore fully pointed out.

There is thus provided novel velocity governing means whereby the speed of an engine or an engine driven vehicle may be satisfactorily limited to a predetermined maximum without detracting from the efficiency and performance qualities thereof, said governor being so constructed that the control valve operates with a snap action when the predetermined maximum speed is attained and remains in fully open position until such speed is reached. Novel control means are also provided for said governor whereby the latter may be automatically rendered ineffective to limit the engine speed or to increase the normal maximum desired speed when the engine is operating under conditions during which maximum power is required and excessive speed is unlikely. The novel governor and control means provided by the present invention are extremely simple, both in construction and operation, durable, dependable and inexpensive to manufacture and install.

Although only a limited number of embodiments of the present invention have been illustrated and described in detail, it is to be expressly understood that the same is not limited thereto. For example, valves 64 and 90 of Figs. 4 and 8, respectively, may be electrically or manually actuated and the several embodiments of the control means for rendering the governor ineffective may each be employed with each of the governors illustrated, as well as with other types of governors known to the art. The fluid pressure motors employed in the embodiment of Figs. 4 and 8 may be operated by compressed air or the like in lieu of vacuum, if desired. Various other changes such as in the design and arrangement of parts illustrated, may also be made without departing from the spirit and scope of the invention, as will now be apparent to those skilled in the art. For a definition of the limits of the invention, reference is had primarily to the appended claims.

What is claimed is:

1. In combination with an internal combustion engine, a governor comprising fluid pressure responsive means for restricting flow through the intake passage of said engine, yielding means for resisting movement of said first-named means in flow restricting direction, and means for limiting movement of said first-named means in said direction including electro-magnetic means, a source of electric energy, means for electrically connecting said electro-magnetic means and said source and inertia responsive switch means in said connecting means.

2. In combination with an internal combustion engine, a governor comprising fluid pressure responsive means for restricting flow through the intake passage of said engine, yielding means for resisting movement of said first-named means in flow restricting direction, and means for limiting movement of said first-named means in said direction including electro-magnetic means, a source of electric energy, means for electrically connecting said electro-magnetic means and said source and gravity controlled switch means in said connecting means.

CHARLES C. STRANGE.
ERIC J. PELBLAD.